United States Patent
Yamamoto et al.

(10) Patent No.: US 10,131,089 B2
(45) Date of Patent: Nov. 20, 2018

(54) PROCESS FOR PRODUCING AUTOMOTIVE GLASS WITH MEMBER

(71) Applicants: NAOMOTO CORPORATION, Osaka (JP); HORI GLASS CO., LTD., Kanagawa (JP)

(72) Inventors: Tadashi Yamamoto, Osaka (JP); Toshihiro Oyama, Osaka (JP); Isao Kurihashi, Kanagawa (JP); Teruki Umezawa, Kanagawa (JP); Jun Kurimoto, Kanagawa (JP); Hiroyuki Harada, Kanagawa (JP)

(73) Assignees: NAOMOTO CORPORATION, Osaka (JP); HORI GLASS CO., LTD., Kanagawa (JP)

( * ) Notice: Subject to any disclaimer, the term of this patent is extended or adjusted under 35 U.S.C. 154(b) by 0 days.

(21) Appl. No.: 15/503,486

(22) PCT Filed: Aug. 18, 2015

(86) PCT No.: PCT/JP2015/073159
§ 371 (c)(1),
(2) Date: Feb. 13, 2017

(87) PCT Pub. No.: WO2016/039090
PCT Pub. Date: Mar. 17, 2016

(65) Prior Publication Data
US 2017/0232663 A1    Aug. 17, 2017

(30) Foreign Application Priority Data
Sep. 9, 2014    (JP) .................. 2014-183093

(51) Int. Cl.
*B29C 65/48* (2006.01)
*B29C 35/04* (2006.01)
(Continued)

(52) U.S. Cl.
CPC ........ *B29C 65/4835* (2013.01); *B29C 35/049* (2013.01); *B29C 66/7465* (2013.01);
(Continued)

(58) Field of Classification Search
CPC .............. B29C 35/049; B29C 66/7465; B29C 65/4835; F22G 3/00; F22G 3/006;
(Continued)

(56) References Cited

U.S. PATENT DOCUMENTS

| 4,295,948 A | 10/1981 | Roman et al. |
| 2007/0113953 A1* | 5/2007 | Haywood ............... B29C 73/02 156/94 |
| 2015/0042804 A1 | 2/2015 | Okuda |

FOREIGN PATENT DOCUMENTS

| JP | 9-263960 | 10/1997 |
| JP | 2002-069390 | 3/2002 |

(Continued)

OTHER PUBLICATIONS

Machine translation of JP2005-146035, Jun. 2005.*
(Continued)

*Primary Examiner* — Philip C Tucker
*Assistant Examiner* — Jimmy R Smith, Jr.
(74) *Attorney, Agent, or Firm* — Wenderoth, Lind & Ponack, L.L.P.

(57) ABSTRACT

Provided is a process for producing an automotive glass with a member in a highly efficient and space-saving manner. The process for producing an automotive glass with a member comprises bonding together an adhesion surface of an adherend and an adhesion surface of an automotive glass using an adhesive, and then curing the adhesive using a superheated steam generator, thereby attaching the adherend to the automotive glass; wherein the superheated steam generator comprises (1) a boiler part for generating steam, (2) a
(Continued)

superheating unit for superheating the steam generated in the boiler part, and (3) a superheated steam vessel equipped internally with one or more heaters and one or more superheated steam outlets for discharging the superheated steam supplied from the superheating unit; and wherein the step of curing the adhesive is performed by covering the adherend placed on the automotive glass with the superheated steam vessel, spraying the superheated steam from the one or more superheated steam outlets to the adherend, and then spraying dry gas.

4 Claims, 3 Drawing Sheets

(51) Int. Cl.
*B60J 1/02* (2006.01)
*B29C 65/00* (2006.01)
*B60J 1/08* (2006.01)
*B60J 1/18* (2006.01)
*C09J 5/06* (2006.01)
*F22G 3/00* (2006.01)
*B29L 31/30* (2006.01)

(52) U.S. Cl.
CPC . *B60J 1/02* (2013.01); *B60J 1/08* (2013.01); *B60J 1/18* (2013.01); *C09J 5/06* (2013.01); *B29L 2031/30* (2013.01); *B32B 2310/04* (2013.01); *B32B 2310/049* (2013.01); *F22G 3/00* (2013.01)

(58) Field of Classification Search
CPC ........ F22G 3/009; C09J 5/06; B32B 2310/04; B32B 2310/049; B29L 2031/30
USPC .............................................. 156/304.6, 499
See application file for complete search history.

(56) References Cited

FOREIGN PATENT DOCUMENTS

| | | |
|---|---|---|
| JP | 2005-146035 | 6/2005 |
| JP | 2007-092878 | 4/2007 |
| JP | 2008-501555 | 1/2008 |
| JP | 2008-100201 | 5/2008 |
| JP | 2009-185246 | 8/2009 |
| JP | 2012-189283 | 10/2012 |
| JP | 2013-186397 | 9/2013 |
| JP | 2013-203250 | 10/2013 |
| WO | 03/018699 | 3/2003 |
| WO | 2005/120794 | 12/2005 |

OTHER PUBLICATIONS

Machine translation of JP2012-189283, Oct. 2012.*
Machine translation of JP2002-069390, Mar. 2002.*
International Search Report dated Oct. 27, 2015 in International (PCT) Application No. PCT/JP2015/073159.
Office Action dated Jun. 14, 2016 in corresponding Japanese Application No. 2014-183093, with English translation.
Extended European Search Report dated Apr. 24, 2018 in corresponding European patent application No. 15839292.8.

* cited by examiner

Positioning reference pin

Camera sensor-mounting bracket

Rib

Bottom surface view
(adhesion surface)

Side surface view

Adhesive bead

Double-sided tape for temporary fixing

Adhesive bead

PROCESS FOR PRODUCING AUTOMOTIVE GLASS WITH MEMBER

TECHNICAL FIELD

The present invention relates to a process for producing an automotive glass with a member.

BACKGROUND ART

It is known that automotive glass is mounted with inner mirror-mounting brackets, camera sensor-mounting brackets, molding, protectors, positioning reference pins, door glass-fastening holders, hinges, and like members. Various adhesives, such as epoxy-based adhesives, urethane-based adhesives, silicone-based adhesives, and modified silicone-based adhesives, are conventionally used to mount these members. Epoxy-based adhesives, urethane-based adhesives, silicone-based adhesives, modified silicone-based adhesives, and like adhesives are generally used.

In particular, polyurethane adhesives comprising polyurethane as a main component and containing a plasticizer, a filler, a pigment, etc., are widely used as joint materials, sealing materials, covering materials, adhesives, and the like, as well as for direct grading for bonding an automobile glass and an automobile body. Polyurethane adhesives used for such purposes are moisture-curable adhesives and classified into one-component type and two-component type adhesives, both of which are cured by a crosslinking reaction promoted by the moisture in the air.

Moisture-curable adhesives are very slowly cured under low-temperature conditions in winter, and the completion of the crosslinking requires several days. In particular, one-component type polyurethane adhesives significantly show this tendency. As a method for increasing the effect of such a moisture-curable adhesive, a method of placing the adhesive in a high-temperature aging room is known; however, even curing in an environment at 30 to 40° C. and 55 to 60% RH requires 8 hours or more. It is difficult to significantly improve the efficiency.

Moreover, a relatively large space was necessary for storing the automotive glass for 8 hours or more. Therefore, it was necessary to provide a large storage space apart from the production line, which problematically increased the number of transportation steps in the production of automotive glass. Furthermore, adhesive-curing required facilities, such as an aging room for controlling humidity etc. Thus, large-scale capital investment was necessary.

In recent years, as a technique that enables production in a highly efficient and space-saving manner, without the need for an aging and drying process after bonding, a technique for promoting curing of thermosetting adhesives by high-frequency induction heating has been developed (PTL 1 etc.).

There are various shapes of automotive glass depending on the design and size of vehicles, and accordingly there are various sizes and shapes of parts. Therefore, a process using high-frequency induction heating requires the preparation of plural high-frequency induction heating devices for every type of car according to the size and shape of the part. Moreover, the curvature of a portion to which an adherend is to be attached varies depending on the type of glass. When high-frequency induction heating is performed on glasses different in their curvature, the distance (clearance) between two sides varies in many cases. The thermosetting adhesive is not completely cured, or the temperature overly increases such that the glass scorches. Thus, there was a problem such that stable quality could not sufficiently be obtained in the production of automotive glass to which a part was attached. Furthermore, when the adherend was plastic, the heat resistance of the adherend was low, and the adherend itself was synchronized with high frequency, causing heat generation. As a result, the adherend melted. Thus, there were various problems. Hence, there has been a demand for processes that overcome these problems.

CITATION LIST

Patent Literature

PTL 1: JP2009-185246A

SUMMARY OF INVENTION

Technical Problem

An object of the present invention is to provide a process for producing an automotive glass with a member in a highly efficient and space-saving manner.

Solution to Problem

The present inventors found that an automotive glass with a member can be produced by curing an adhesive in a short period of time by a specific method. The present invention has thus been completed.

Specifically, the present invention provides a process for producing an automotive glass with a member described in the following items 1 to 8.

Item 1. A process for producing an automotive glass with a member, the process comprising bonding together an adhesion surface of an adherend and an adhesion surface of an automotive glass using an adhesive, and then curing the adhesive using a superheated steam generator, thereby attaching the adherend to the automotive glass;

wherein the superheated steam generator comprises:
(1) a boiler part for generating steam,
(2) a superheating unit for superheating the steam generated in the boiler part, and
(3) a superheated steam vessel equipped internally with one or more heaters and one or more superheated steam outlets for discharging the superheated steam supplied from the superheating unit; and wherein the step of curing the adhesive is performed by covering the adherend placed on the automotive glass with the superheated steam vessel, spraying the superheated steam from the one or more superheated steam outlets to the adherend, and then spraying dry gas.

Item 2. The production process according to item 1, wherein the temperature of the one or more heaters is 125 to 195° C.

Item 3. The production process according to item 1 or 2, wherein the dry gas is sprayed for 10 seconds or more.

Item 4. The production process according to any one of items 1 to 3, wherein the superheated steam is sprayed for 30 to 180 seconds.

Item 5. The production process according to any one of items 1 to 4, wherein the pressure of the steam supplied to the superheating unit is 0.1 to 0.3 MPa.

Item 6. The production process according to any one of items 1 to 5, wherein the adherend comprises at least one member selected from the group consisting of polyetherimide, polybutylene terephthalate, polyethylene terephthalate, polycarbonate, polyamide typified by 6-nylon and 66-nylon, polyacetal, polyethylene, polypropylene, ABS, and AES.

Item 7. The production process according to any one of items 1 to 6, wherein the adhesive contains a two-component silicone/epoxy adhesive and/or a one-component curing urethane adhesive.

Item 8. The production process according to any one of items 1 to 7, wherein a primer is applied to the adhesion surface of the adherend and/or the adhesion surface of the automotive glass.

1. Automotive Glass with Member

The automotive glass with a member produced by the process of the present invention is obtained by bonding an adherend (member) to an automotive glass. More specifically, the adherend is bonded to the automotive glass with an adhesive.

In the automotive glass with a member of the present invention, the clearance between the adherend and the automobile glass, that is, the thickness of the adhesive, is preferably 0.1 to 3.0 mm, and particularly preferably 0.2 to 1.0 mm. When the thickness is 0.1 mm or more, the glass is less likely to be cracked due to the cushion effect of the adhesive. When the thickness is 3.0 mm or less, vibration (e.g., vibration during lifting and lowering of the door glass) is less likely to occur.

1.1. Automotive Glass

In the present invention, the automotive glass is not particularly limited. Examples include automotive tempered glass, black ceramic-printed glass, laminated glass using a resin layer, such as polyvinyl butyral, as an intermediate layer, and the like. The process of the present invention allows curing of the adhesive in a short period of time without the need for excessive heating, and is thus particularly suitable for automotive glass, which incurs problems due to excessive heating. For example, in the case of tempered glass, surface strength is increased by heat treatment of raw glass; therefore, when an excessive temperature is applied during bonding of an adherend, such as a door glass-fastening holder, the strength of the glass itself is reduced. Moreover, in the case of laminated glass, the resin (e.g., polyvinyl butyral) of the intermediate layer melts and foams due to excessive overheat, thereby causing defects such as strength reduction and poor appearance. Therefore, the process of the present invention, which does not perform excessive heating, can be preferably used particularly for automotive glass, such as tempered glass, laminated glass, etc.

Moreover, the automotive glass may be degreased so as to remove dust and oil. Degreasing is generally performed in an organic solvent. The organic solvent used for degreasing is not particularly limited; however, typical examples include lower alcohol solvents, such as methanol, ethanol, and isopropyl alcohol; and ketones, such as acetone and methyl ethyl ketone.

The shape of the automotive glass is not particularly limited. Examples include door glass, windshield, rear glass, side glass, quarter glass, and the like.

1.2. Adherend

In the present invention, the adherend is not particularly limited. Examples include camera sensor-mounting brackets, rain sensor-mounting brackets, inner mirror-mounting brackets, malls, protectors, positioning reference pins, door glass-fastening holders, hinges, and the like. The shape and size of the adherend, the size of the adhesion surface of the adherend, etc., are not particularly limited, and can be appropriately selected in consideration of the size, weight, and shape of the automotive glass to which the adherend is to be attached, applications thereof, etc.

The material of the adherend of the present invention is not particularly limited, and may be metal or resin. Examples of metal include steel, stainless steel, aluminum, and the like. Examples of resin include polyethylene; polypropylene; polyester resins typified by polybutylene terephthalate, polyethylene terephthalate, etc.; polyamide resin; polyacetal resin; ABS resin; polycarbonate resin; and engineering plastics, such as polyetherimide resin. These resins can be used singly or as an alloy obtained by mixing two or more members. Moreover, in order to increase strength, an inorganic substance, typified by glass fiber, may be mixed.

The process of the present invention, which does not require excessive heating, is suitably used particularly when the adherend is a material with relatively low heat resistance, such as ABS resins, polycarbonate resins, and alloys thereof.

Moreover, the adherend may be degreased so as to remove dust and oil. Degreasing is generally performed in an organic solvent. The organic solvent used for degreasing is not particularly limited. Typical examples include lower alcohol solvents, such as methanol, ethanol, and isopropyl alcohol; and ketones, such as acetone and methyl ethyl ketone.

In terms of maintaining the clearance between the adherend and the automotive glass, it is preferable that the adhesion surface of the adherend is provided with a projection generally called a rib. The width, number, etc., of ribs to be provided on the adhesion surface of the adherend are not particularly limited, and may be appropriately determined.

The adherend may be molded by a known method. When the material is a resin, may be molded by known injection molding.

The adhesion surface of the adherend may be modified by a known method. The method for modifying the adhesion surface is not particularly limited. For example, UV irradiation, corona discharge, plasma treatment, or like method can be used. The treatment time can be suitably changed according to the material of the adherend. In the method for modifying the adhesion surface, devices and systems manufactured and sold by various companies may be used.

1.3. Adhesive

Examples of the adhesive of the present invention include those in which curing is promoted by heat. Specific examples include acrylic adhesives, epoxy-based adhesives, urethane-based adhesives, silicone-based adhesives, modified silicone-based adhesives, and other known thermosetting adhesives. These adhesives may be of one-component type or two-component type. Preferred in terms of being used to bond an automotive glass and an adherend are two-component modified silicone/epoxy adhesives and one-component heat-curing urethane adhesives, both of which have good results.

1.3.1. Two-Component Modified Silicone/Epoxy Adhesive

The two-component modified silicone/epoxy adhesive contains an alkoxysilyl group-containing polymer, a curing catalyst for the alkoxysilyl group-containing polymer, a vinyl-based polymer, an epoxy resin, an epoxy curing agent, and an inorganic filler.

It is preferable that the alkoxysilyl group-containing polymer substantially has a polyoxyalkylene structure as the main chain thereof, and has, as the alkoxysilyl group, one or more members selected from the group consisting of dialkyl monoalkoxysilyl groups, monoalkyl dialkoxysilyl groups, and trialkoxysilyl groups.

It is necessary that the alkoxysilyl group-containing polymer has one or more alkoxysilyl groups per molecule; however, two or more alkoxysilyl groups are preferable in terms of reactivity, and temporary fixing ability can be promptly imparted to the adhesive layer. The number of alkoxysilyl groups may be 3 or 4; however, 5 or more alkoxysilyl groups are not preferable because storage stability decreases, and the vibration resistance of the adhesive cured layer is not sufficient. The optimal number of alkoxysilyl groups is 2 to 4.

As the alkoxysilyl group-containing polymer, any polymer that contains an alkoxysilyl group can be used without limitation; however, the main chain structure of the alkoxysilyl group-containing polymer is preferably a polyoxyalkylene structure represented by —(R—O)n-, wherein R is alkylene, such as ethylene, propylene, isobutylene, tetramethylene, etc. These alkylene groups may be mixed together. As for the molecular weight of the alkoxysilyl group-containing polymer, the number average molecular weight (Mn) is preferably about 500 to 30,000, in terms of reactivity and properties after the reaction. The Mn is more preferably 2,000 to 20,000.

The alkoxysilyl group-containing polymer preferably has, as the alkoxysilyl group, one or more members selected from dialkylmonoalkoxysilyl groups, monoalkyldialkoxysilyl groups, and trialkoxysilyl groups. Examples of alkoxy include methoxy, ethoxy, propoxy, and the like. Particularly preferred are alkoxysilyl group-containing polymers containing a monomethyldimethoxysilyl group and a trimethoxysilyl group. The most preferred are alkoxysilyl group-containing polymers containing both a monomethyldimethoxysilyl group and a trimethoxysilyl group. Naturally, the alkoxysilyl group-containing polymer may be a mixture of polymers having various alkoxysilyl groups. A mixture of a silicone polymer having a monomethyldimethoxysilyl group and a silicone polymer having a trimethoxysilyl group can be preferably used as the alkoxysilyl group-containing polymer containing both a monomethyldimethoxysilyl group and a trimethoxysilyl group.

A preferable method for obtaining a polymer having a polyoxyalkylene structure as a main chain structure and having an alkoxysilyl group is such that a polyoxyalkylene polymer is first obtained by reacting an alkylene oxide (e.g., ethylene oxide or propylene oxide) with a diol (e.g., ethylene glycol or propylene glycol), triol (e.g., glycerol or hexanetriol), tetraol (e.g., pentaerythritol or diglycerol), or polyol (e.g., sorbitol) under known conditions, and an alkoxysilyl group is then introduced into the polymer. Preferable polyoxyalkylene polymers are divalent to hexavalent polyoxypropylene polyols, particularly polyoxypropylene diol and polyoxypropylene triol.

The first method for introducing an alkoxysilyl group into a polyoxyalkylene polymer is to introduce an unsaturated double bond into the terminal hydroxyl group of the polyoxyalkylene polymer, and then a hydrosilyl compound represented by the general formula: $HSi(OR^1)_2(R^2)$ and/or $HSi(OR^1)_3$ ($R^1$ may be the same or different, and are each hydrogen or $C_1$-$C_5$ alkyl, and $R^2$ is $C_1$-$C_{10}$ alkyl or $C_6$-$C_{20}$ aryl) is reacted.

An unsaturated double bond can be introduced by, for example, reacting a compound having an unsaturated double bond and a functional group reactive with a hydroxyl group, with the hydroxyl group of the polyoxyalkylene polymer to bond them by an ether bond, an ester bond, a urethane bond, a carbonate bond, or the like. In the polymerization of oxyalkylene, an allyl group-containing epoxy compound, such as allyl glycidyl ether, may be added and copolymerized to thereby introduce a double bond into the side chain of the polyoxyalkylene polymer.

The introduced unsaturated double bond is reacted with a hydrosilyl compound mentioned above to thereby obtain an alkoxysilyl group-containing polymer into which an alkoxysilyl group has been introduced. In the reaction with a hydrosilyl compound, it is recommended that a catalyst, such as a platinum-based catalyst, a rhodium-based catalyst, a cobalt-based catalyst, a palladium-based catalyst, or a nickel-based catalyst, is used. Among them, platinum-based catalysts, such as chloroplatinic acid, platinum metal, platinum chloride, and platinum olefin complexes, are preferred. The reaction with a hydrosilyl compound is preferably performed at a temperature of 30 to 150° C., particularly 60 to 120° C., for several hours.

The second method for introducing an alkoxysilyl group into a polyoxyalkylene polymer is to react the hydroxyl group of the polyoxyalkylene polymer with an isocyanate silyl compound represented by the general formula: $R^2$—Si$(OR^1)_2(R^3NCO)$ and/or $(R^3NCO)Si(OR^1)_3$ (wherein $R^1$ and $R^2$ are as defined above, and $R^3$ is $C_1$-$C_{17}$ divalent hydrocarbon). A known urethanization catalyst may be used in this reaction. The reaction is generally performed at a temperature of 20 to 200° C., particularly 50 to 150° C., for several hours, thereby obtaining an alkoxysilyl group-containing polymer. The third method for introducing an alkoxysilyl group into a polyoxyalkylene polymer is to react the hydroxyl group of the polyoxyalkylene polymer with a polyisocyanate compound, such as tolylene diisocyanate, to introduce an isocyanate group, followed by a reaction with a compound represented by the general formula: $R^2$—Si$(OR^1)_2(R^3W)$ and/or $(R^3W)Si(OR^1)_3$ (wherein $R^1$, $R^2$, and $R^3$ are as defied above, and W is an active hydrogen group selected from hydroxyl, carboxyl, mercapto, primary amino, and secondary amino). As a result of the reaction between W and the isocyanate group, an alkoxysilyl group-containing polymer can be obtained.

Further, as the fourth method, an unsaturated double bond may be introduced into the terminal of the polyoxyalkylene polymer in the same manner as in the first method, followed by a reaction with a compound of the formula in the third method wherein W is mercapto. Examples of such a compound include 3-mercaptopropylmethyldimethoxysilane, 3-mercaptopropyltrimethoxysilane, 3-mercaptopropyltriethoxysilane, and the like. A polymerization initiator, such as a radical generator, may be used in the reaction. In some cases, the reaction may be performed by radiation or heat, without using a polymerization initiator.

The polymerization initiator can be a peroxide-based polymerization initiator, an azo-based polymerization initiator, a redox-based polymerization initiator, a metal compound catalyst, or the like. Usable peroxide-based polymerization initiators and azo-based polymerization initiators include polymerization initiators having a reactive silicone functional group. Specific examples include benzoyl peroxide, tert-alkyl peroxyester, acetyl peroxide, diisopropyl peroxycarbonate, 2,2'-azobis(2-isobutyronitrile), 2,2'-azobis(2-methylbutyronitrile), 2,2'-azobis(2-methyl-4-trimethoxysilylpentonitrile), 2,2'-azobis(2-methyl-4-methyldimethoxysilylpentonitrile), and the like. The fourth reaction is preferably performed at 20 to 200° C., particularly 50 to 150° C., for several hours to several tens of hours.

The polymer having a polyoxyalkylene structure as a main chain structure and having an alkoxysilyl group may be one commercially available as a modified silicone polymer. For example, "Silyl SAT200" (trade name, produced by Kaneka Corp.), in which the terminal structure is a monomethyldimethoxysilyl group, is available.

The two-component modified silicone/epoxy adhesive contains a curing catalyst for the alkoxysilyl group-containing polymer. The curing catalyst serves to promote the hydrolysis condensation polymerization reaction of the alkoxysilyl group. This reaction proceeds only with the moisture content of the air; however, in order to promote the progress of the reaction, it is recommended to use a curing catalyst, such as an organic tin compound, a metal complex, a basic compound, or an organophosphorus compound. The amount of the curing catalyst used is preferably 0.01 to 10 parts by mass based on 100 parts by mass of the alkoxysilyl group-containing polymer of the two-component modified silicone/epoxy adhesive.

Specific examples of organic tin compounds include reaction products of phthalic acid diester and dibutyltin dilaurate, dibutyltin dimaleate, dibutyltin phthalate, stannous octylate, dibutyltin methoxide, dibutyltin diacetylacetate, dibutyltin diversatate, dibutyltin oxide, or dibutyltin oxide. Examples of metal complexes include titanate compounds, such as tetrabutyl titanate, tetraisopropyl titanate, and triethanolamine titanate; carboxylic acid metal salts, such as lead octylate, lead naphthenate, nickel naphthenate, cobalt naphthenate, bismuth octylate, and bismuth versatate; metal acetylacetonate complexes, such as aluminum acetylacetonate complexes and vanadium acetylacetonate complexes; and the like.

Examples of basic compounds include aminosilanes, such as γ-aminopropyltrimethoxysilane and γ-aminopropyltriethoxysilane; quaternary ammonium salts, such as tetramethyl ammonium chloride and benzalkonium chloride; "DABCO (registered trademark)" series and "DABCO BL" series (produced by Sankyo Air Products Co., Ltd.); linear or cyclic tertiary amines and quaternary ammonium salts containing a plurality of nitrogen atoms, such as 1,8-diazabicyclo[5.4.0]undec-7-ene; and the like.

Examples of organophosphorus compounds include monomethyl phosphoric acid, di-n-butyl phosphoric acid, triphenyl phosphate, and the like.

The two-component modified silicone/epoxy adhesive contains a vinyl-based polymer as an essential component. The vinyl-based polymer has an action to promote the hydrolysis condensation polymerization reaction of the alkoxysilyl group, although the reason therefor is unclear. Examples of the monomer that forms a vinyl-based polymer include (meth)acrylic acid; (meth)acrylates that are $C_1$-$C_{20}$ alkyl esters, such as methyl (meth)acrylate, ethyl (meth)acrylate, n-propyl (meth)acrylate, isopropyl (meth)acrylate, n-butyl (meth)acrylate, isobutyl (meth) acrylate, sec-butyl (meth) acrylate, tert-butyl (meth)acrylate, n-hexyl (meth)acrylate, 2-ethylhexyl (meth)acrylate, dodecyl (meth)acrylate, tetradecyl (meth)acrylate, hexadecyl (meth)acrylate, and octadecyl (meth)acrylate; (meth)acrylates, such as cyclohexyl (meth)acrylate, benzyl (meth)acrylate, phenyl (meth)acrylate, isobornyl (meth)acrylate, dimethylaminoethyl (meth) acrylate, tert-butylaminoethyl (meth) acrylate, glycidyl (meth) acrylate, tetrahydrofuran (meth)acrylate, allyl (meth)acrylate, 2-hydroxyethyl (meth) acrylate, hydroxypropyl (meth) acrylate, 2-hydroxy-3-phenoxypropyl (meth)acrylate, trimethylolpropane tri(meth)acrylate, trifluoroethyl (meth)acrylate, "M-110" and "M-111" (trade names, produced by Toagosei Co., Ltd.), and "VeoVa 9" and "VeoVa 10" (trade names, produced by Shell Chemicals); acrylonitrile and α-methylacrylonitrile; 2-(meth)acryloyloxyethyl succinic acid, 2-(meth)acryloyloxyethyl maleic acid, 2-(meth)acryloyloxyethyl phthalic acid, and 2-(meth) acryloyloxyethyl hexahydrophthalic acid; (meth) acrylamide; acrylic monomers, such as (meth)acrylic glycidyl ether; styrene-based monomers, such as styrene, vinyl toluene, divinyl benzene, α-methylstyrene, o-methylstyrene, m-methylstyrene, p-methylstyrene, p-ethylstyrene, and p-methoxystyrene; vinyl group-containing monomers, such as vinyl chloride, vinyl acetate, vinyl propionate, vinyl pyrrolidone, vinyl carbazole, vinyl ether, and vinyl glycidyl ether; allyl group-containing monomers, such as allyl glycidyl ether; 2,4-dicyanobutene-1, butadiene, isoprene, chloroprene, and other olefins or halogenated olefins; unsaturated esters; and the like. These can be used singly or in a combination of two or more.

In terms of improving the vibration resistance and heat resistance of the adhesive layer, it is preferable to select a monomer, a homopolymer of which has a Tg of 0 to 200° C. Examples of such monomers include methyl methacrylate, ethyl methacrylate, n-propyl methacrylate, isopropyl methacrylate, n-butyl methacrylate, isobutyl methacrylate, sec-butyl methacrylate, tert-butyl methacrylate, n-hexadecyl methacrylate, n-octadecyl methacrylate, cyclohexyl (meth) acrylate, benzyl (meth)acrylate, phenyl (meth)acrylate, isobornyl (meth)acrylate, dimethylaminoethyl (meth) acrylate, tert-butylaminoethyl (meth) acrylate, glycidyl methacrylate, tetrahydrofuran (meth)acrylate, allyl methacrylate, 2-hydroxyethyl methacrylate, hydroxypropyl methacrylate, 2-hydroxy-3-phenoxypropyl (meth) acrylate, trimethylolpropane tri(meth)acrylate, trifluoroethyl (meth)acrylate, "M-110" and "M-111" (trade names, produced by Toagosei Co., Ltd.), "VeoVa 9" and "VeoVa 10" (trade names, produced by Shell Chemicals); trifluoroethyl methacrylate, acrylonitrile, 2-methacryloyloxyethyl succinic acid, 2-methacryloyloxyethyl maleic acid, 2-methacryloyloxyethyl phthalic acid, 2-methacryloyloxyethyl hexahydrophthalic acid, styrene, α-methylstyrene, o-methylstyrene, m-methylstyrene, p-methylstyrene, p-ethylstyrene, p-methoxystyrene, vinyl chloride, vinyl pyrrolidone, vinylcarbazole, and the like. Among these, one, or two or more monomers selected from methyl methacrylate glycidyl methacrylate, acrylonitrile, and styrene are preferred. It is more preferable that two or more of these are used in combination.

Moreover, an alkoxysilyl group-containing monomer can also be used in the synthesis of a vinyl-based polymer. Specific examples include vinylmethyldimethoxysilane, vinylmethyldiethoxysilane, vinyltrimethoxysilane, tris(2-methoxyethoxy)vinylsilane, 3-(meth) acryloyloxypropylmethyldimethoxysilane, 3-(meth)acryloyloxypropyltrimethoxysilane, and the like. Among these, 3-(meth) acryloyloxypropylmethyldimethoxysilane and 3-(meth) acryloyloxypropyltrimethoxysilane are preferred. Such an alkoxysilyl-containing monomer is preferably used in combination with the above monomer. The amount of the alkoxysilyl-containing monomer is preferably 0.01 to 10 mass % based on 100 parts by mass of the monomer component for synthesizing a vinyl-based polymer.

The vinyl-based polymer can be obtained by polymerizing the above monomer by a known method, such as radical polymerization, anionic polymerization, or cationic polymerization. Polymerization may be performed in the presence of a solvent, such as xylene, toluene, acetone, methyl ethyl ketone, ethyl acetate, or butyl acetate. After the solvent is removed by vacuum distillation or like method, if necessary, after completion of the polymerization, the polymer can be mixed with, for example, an alkoxysilyl group-containing polymer or an epoxy resin; however, the solvent removal step is complicated. Therefore, a method for polymerizing a monomer component for a vinyl-based polymer in the presence of an alkoxysilyl group-containing polymer is recommended, because a mixture of both components can be easily obtained.

Particularly preferable is a radical polymerization method performed in the presence of an azo-based polymerization initiator, such as 2,2'-azobis(2-isobutyronitrile), 2,2'-azobis(2-methylbutyronitrile), 2,2'-azobis(2,4-dimethylvaleronitrile), 2,2'-azobis(2-methyl-4-trimethoxysilylpentonitrile), 2,2'-azobis(2-methyl-4-methyldimethoxysilylpentonitrile), "VA-046B," "VA-057," "VA-061," "VA-085," "VA-086," "VA-096," "V-601," "V-65," or "VAm-110" (trade names, produced by Wako Pure Chemical Industries, Ltd.); or a peroxide-based polymerization initiator, such as benzoyl peroxide, tert-alkyl peroxyester, acetyl peroxide, or diisopropylperoxy carbonate. In this case, polymerization may be performed in the presence of a chain transfer agent, such as lauryl mercaptan, γ-mercaptopropyltrimethoxysilane, γ-mercaptopropylmethyldimethoxysilane, thio-β-naphthol, thiophenol, n-butyl mercaptan, ethyl thioglycolate, isopropyl mercaptan, t-butyl mercaptan, or γ-trimethoxysilylpropyl disulfide.

Moreover, modified silicone polymers, which are mixtures of alkoxysilyl group-containing polymers and vinyl-based polymers, have already been commercially available under the trade names of "ES-GX3406a" (produced by Asahi Glass Co., Ltd.), "Silyl MA440," "Silyl MA447," and "Silyl MA430" (produced by Kaneka Corporation), and the like. These products can also be used.

The two-component modified silicone/epoxy adhesive contains an epoxy resin and an epoxy curing agent. The epoxy resin is three-dimensionally cured by an epoxy curing agent, and thus serves to enhance the heat resistance of the adhesive layer and adhesion to the glass. Examples of epoxy resins include known bisphenol-type epoxy resins; biphenyl-type epoxy resins; cycloaliphatic epoxy resins; polyfunctional glycidylamine resins, such as tetraglycidylaminodiphenylmethane; polyfunctional glycidyl ether resins, such as tetraphenyl glycidyl ether ethane; phenol novolak-type epoxy resins, cresol novolak-type epoxy resins, and the like. Various grades of epoxy resins have been commercially available, and can also be used. Preferred in terms of workability are bisphenol A liquid resins that have a molecular weight of about 300 to 500 and are liquid at ordinary temperature.

The epoxy curing agent is not particularly limited, as long as it is a generally used curing agent. Examples include amines, such as triethylenetetramine, diethylenetriamine, metaxylylenediamine, metaphenylenediamine, diaminodiphenylmethane, isophoronediamine, and 2,4,6-tris(dimethylaminomethyl)phenol; tertiary amine salts; polyamide resins; imidazoles; carboxylic anhydrides, such as phthalic anhydride; and like compounds. In particular, the two-component modified silicone/epoxy adhesive is preferably an aliphatic amine-based curing agent with which a hardening reaction takes place relatively quickly. Further, a latent curing agent, such as ketimine in which active amine is blocked and activated by the moisture content of the air, can be used. The epoxy curing agent may be used in an amount of 0.1 to 300 parts by mass based on 100 parts by mass of the epoxy resin.

The inorganic filler adjusts the viscosity and structural viscosity index of the adhesive before curing, serves as an extender, and has an action to increase the strength and heat resistance of the adhesive cured layer as a reinforcing agent. The inorganic filler is preferably a powdered material of calcium carbonate, silica, titanium dioxide, talc, mica, or the like. As calcium carbonate, colloidal calcium carbonate and heavy calcium carbonate can both be used.

Although the above-explained components are essentially contained, it is preferable to adjust the amounts of the vinyl-based polymer, epoxy resin, and inorganic filler within the range of, respectively, 1 to 200 parts by mass, 30 to 70 parts by mass, and 10 to 300 parts by mass, based on 100 parts by mass of the alkoxysilyl group-containing polymer. If the amount of the vinyl-based polymer is overly low, the action to promote the hydrolysis condensation polymerization reaction of the alkoxysilyl group is not exhibited. If the amount of the vinyl-based polymer is overly high, the excellent vibration resistance of the alkoxysilyl-containing polymer may be inhibited. If the amount of the epoxy resin is overly low, the final adhesive strength, heat resistance, chemical resistance, etc., of the adhesive cured layer may be insufficient. If the amount of the epoxy resin is overly high, vibration resistance may be reduced. If the amount of the inorganic filler is overly low, the viscosity of the adhesive before curing may be lower than the intended value, and inconvenience, such as sagging, may occur. If the amount of the inorganic filler is overly high, workability is reduced.

In such an adhesive, the curing reaction of the alkoxysilyl group-containing polymer is started by the moisture content of the air; therefore, it is preferable to mix each component immediately before use. In order to obtain a stable curing rate regardless of the external environment, it is preferable to avoid contact with the moisture content of the air during mixing. For example, it is recommended that mixing is performed while blocking air by a static mixer or the like.

In consideration of shorter mixing time and the pot life, a two-component type adhesive may be used, and the two components may be mixed immediately before use. If the two-component modified silicone/epoxy adhesive is divided into an A agent and a B agent, for example, the alkoxysilyl group-containing polymer is mixed in the A agent, the curing catalyst for the alkoxysilyl group-containing polymer is mixed in the B agent, the epoxy resin is mixed in the B agent, and the epoxy curing agent is mixed in the A agent, thereby increasing the pot life. When a commercially available vinyl-based polymer in the form of a mixture with an alkoxysilyl group-containing polymer is used, the vinyl-based polymer is contained in the A agent. However, a vinyl-based polymer may be separately synthesized, and mixed in the B agent. An inorganic filler may be mixed into the A agent or the B agent, or into both agents. It is preferable that an inorganic filler is mixed in both the A agent and B agent to adjust the viscosity of both agents to an equivalent level, because it is easy to mix them. When the A agent and the B agent are each prepared, a known mixing means, such as a planetary mixer, can be used.

Such adhesives are commercially available from Konishi Co., Ltd. under the trade names of MOS (registered trademark) 200 and MOS (registered trademark) 300.

1.3.2 One-Component Curing Urethane Adhesive

The one-component curing urethane adhesive is not particularly limited, and is, for example, an adhesive containing an amine-based latent curing agent and a curing catalyst, or an adhesive containing an isocyanate compound encapsulated in microcapsules. The latter adhesive is more preferable than the former adhesive. The temperature at which the outer shell of the microcapsule is dissolved is particularly preferably about 80 to 120° C. At a temperature of 80° C. or less, deterioration and aging of the adhesive occur during storage in a living environment. At a temperature of 120° C. or more, the adherend may be damaged during curing.

The polyurethane composition may contain a filler, a plasticizer, an antioxidant, a pigment, a silane coupling agent, a dispersant, a solvent, etc.

Examples of fillers include calcium carbonate, silica, and the like. Calcium carbonate is roughly divided into heavy calcium carbonate and precipitated calcium carbonate; however, in order to prevent the reaction between the isocyanate group and the moisture content, and improve storage stability, precipitated calcium carbonate whose surface is treated with a fatty acid ester is preferable.

The fatty acid and ester that constitute the fatty acid ester for performing surface treatment of calcium carbonate are not limited. Examples include stearic acid stearate, stearic acid laurate, palmitic acid stearate, and palmitic acid laurate. Moreover, an ester obtained from a monohydric alcohol can also be used. The amount of fatty acid ester used for surface treatment is not particularly limited, but preferably varies depending on the particle size of calcium carbonate. The amount of fatty acid ester used is generally about 1 to 20% of the weight of calcium carbonate.

The amount of the precipitated calcium carbonate surface-treated with a fatty acid ester mentioned above is preferably within the range of 50 to 150 parts by weight based on 100 parts by weight of the urethane polymer.

Silica is classified into a hydrophilic grade and a hydrophobic grade, and both grades can be used.

Examples of plasticizers include dioctyl phthalate (DOP), dibutyl phthalate (DBP), dilauryl phthalate (DLP), dibutylbenzyl phthalate (BBP), dioctyl adipate, diisodecyl adipate, trioctylphosphate, tris(chloroethyl)phosphate, tris(dichloropropyl)phosphate, adipic acid propylene glycol polyester, adipic acid butylene glycol polyester, epoxy stearic acid alkyl, and epoxidized soybean oil. These can be used singly or as a mixture thereof.

Antioxidants refer to organic compounds that suppress or prevent the action of oxygen under conditions, such as light and heat, on various autoxidation substances. Examples of radical chain inhibitors include phenol derivatives, such as butylated hydroxytoluene (BHT) and butylated hydroxyanisole (BHA); aromatic amines, such as diphenylamine and phenylenediamine; phosphites, such as triphenyl phosphite; and the like.

Pigments are classified into inorganic and organic pigments. Examples of inorganic pigments include metal oxides, such as carbon black, titanium oxide, zinc oxide, ultramarine blue, and red oxide; sulfur materials, such as lithopone, lead, cadmium, iron, cobalt, and aluminum; hydrochloride, sulfate, and the like. Examples of organic pigments include azo pigments, copper phthalocyanine pigments, and the like.

Silane coupling agents generally refer to organosilicon compounds having a functional group that can chemically bond inorganic materials, such as glass, silica, metal, and clay, and organic materials, such as polymers, which are incompatible with each other, and that are represented by the following formula (1):

 Formula (1)

(wherein X is a hydrolyzable substituent, such as alkoxy, acetoxy, isopropoxy, amino, or halogen, and reacts with inorganic materials; and Y is vinyl, epoxy, amino, methacryl, mercapto, or the like that easily reacts with organic materials).

Dispersants refer to substances that form solids into fine particles, and disperse them in liquid. Examples include sodium hexametaphosphate, condensed sodium naphthalenesulfonate, and surfactants.

In the composition of the present invention, a solvent may be used, and an aromatic hydrocarbon solvent is preferably used. Aromatic solvents refer to xylene, toluene, etc.

Such an adhesive is commercially available from Henkel under the trade name of Terolan 1510.

2. Process for Producing Automotive Glass with Member

The process for producing an automotive glass with a member of the present invention comprises bonding together an adhesion surface of an adherend and an adhesion surface of an automotive glass using an adhesive (hereinafter also referred to as the "bonding step"), and then curing the adhesive using a superheated steam generator (hereinafter also referred to as the "curing step"), thereby attaching the adherend to the automotive glass;

wherein the superheated steam generator comprises:
(1) a boiler part for generating steam,
(2) a superheating unit for superheating the steam generated in the boiler part, and
(3) a superheated steam vessel equipped internally with one or more heaters and one or more superheated steam outlets for discharging the superheated steam supplied from the superheating unit; and wherein the step of curing the adhesive is performed by covering the adherend placed on the automotive glass with the superheated steam vessel, spraying the superheated steam from the one or more superheated steam outlets to the adherend, and then spraying dry gas.

The automotive glass with a member, the adherend, the automotive glass, and the adhesive are as described above.

2.1. Bonding Step

The bonding step is to bond together an adhesion surface of an adherend and an adhesion surface of an automotive glass by applying an adhesive mentioned above to the adhesion surface of the adherend and/or the adhesion surface of the automotive glass.

The method for applying the adhesive to the adhesion surface of the adherend is not particularly limited, and a known method can be used. Examples of the coating method include coating by a one-component dispenser, a one-component cartridge air gun, a two-component mixer, a two-component cartridge air gun, or an ink-jet coating machine; spray coating; coating with a brush; etc. For example, when a two-component adhesive is used, a known two-component mixer may be used to discharge the two-component adhesive to the adherend and/or the adhesion surface of the adherend.

A primer may be applied to the adhesion surface of the adherend and/or the adhesion surface of the automotive glass before the adhesive is applied. The primer may also be applied by a known method, similarly to the coating of the adhesive.

As the primer, a polyisocyanate composition, a silane coupling agent, or the like that is generally called a primer may be applied to the adherend. The primer is not particularly limited.

Silane coupling agents generally refer to organosilicon compounds having a functional group that can chemically bond inorganic materials, such as glass, silica, metal, and clay, and organic materials, such as polymers, which are incompatible with each other, and that are represented by the following formula (2):

 Formula (2)

wherein X and Y are as defined above.

The adhesive may be applied to either the adhesion surface of the adherend or the adhesion surface of the automotive glass, or both of them. It is preferable that the adhesive is applied to the adhesion surface of the adherend, because the movable range of the adhesive coating device can be suppressed, and a small adhesive coating device is sufficient.

The adhesive may be applied to only part of the adhesion surface of the adherend, as long as the amount thereof is sufficient for bonding of the adherend.

The total coating amount of the adhesive can be suitably changed depending on the mass, shape, etc., of the member to be attached to the glass, and is preferably 0.01 to 0.1 g/cm$^2$.

A double-sided tape or the like may be applied to the adhesion surface for temporary fixing; however, it is unnecessary in the present invention to use a double-sided tape etc. for temporary fixing, because the curing step is short.

2.2. Curing Step

The curing step is to cure the adhesive applied in the above bonding step, using a superheated steam generator.

The superheated steam generator of the present invention comprises:
(1) a boiler part for generating steam,
(2) a superheating unit for superheating the steam generated in the boiler part, and
(3) a superheated steam vessel equipped internally with one or more heaters and one or more superheated steam outlets for discharging the superheated steam supplied from the superheating unit.

The superheated steam outlets discharge the superheated steam supplied from the superheating unit.

In the curing step of the present invention, the step of curing the adhesive is performed by covering the adherend placed on the automotive glass with the superheated steam vessel, spraying the superheated steam to the adherend from the superheated steam outlets, and then spraying dry gas. Thus, the adhesive can be cured in a short period of time by using a superheated steam vessel equipped internally with one or more superheated steam outlets and one or more heaters to cover the adhesion part, and spraying the superheated steam. In the process of the present invention, the adhesive is cured by selectively applying the superheated steam to the adhesion part, and it is thus possible to avoid the risk of impairing the appearance etc. of the automotive glass. Moreover, due to the spraying of dry gas, the adhesion of moisture can be prevented, and a reduction of the appearance and transparency of the automotive glass with a member can be prevented.

Furthermore, the superheated steam vessel 1 may have a size sufficient for covering the adherend. Thus, only part of the automotive glass can be covered, and the operation can be conducted in a narrower space than before.

The superheated steam vessel 1 used in the curing step of the present invention comprises at least a vessel 2 for covering an adherend placed on an automotive glass, one or more superheated steam outlets for discharging superheated steam generated by a boiler and a superheating unit connected to the superheated steam vessel 1, and one or more heaters 4 for maintaining the internal temperature of the superheated steam vessel 1. The superheated steam outlets each comprise, for example, a superheated steam tube 3 through which the superheated steam generated by the boiler and the superheating unit passes, and a nozzle hole 6 placed so that the superheated steam in the tube 3 is discharged into the vessel 2. FIG. 1 schematically shows an embodiment of the superheated steam vessel 1.

The vessel 2 for covering the adherend 9 may be one that can cover an adherend 9 placed on an automotive glass 8. The material of the vessel 2 may be a stainless steel material etc. in terms of corrosion resistance. The shape of the vessel 2 may be, for example, an approximate box shape with one side opened. The adherend 9 is located in the inside of the vessel 2, and the opening outer edge is placed on the automotive glass 7, so that the adherend 9 is surrounded by the automotive glass 7 and the vessel 2 (FIG. 2). Accordingly, the opening outer edge of the vessel 2 preferably has a shape along the shape of the automotive glass 8.

The vessel 2 is preferably provided with an openable exhaust port 7, in order to adjust the internal pressure of the vessel. The position of the exhaust port 7 is not particularly limited; however, the exhaust port 7 is preferably located in a position opposite to the opening of the vessel 2.

Moreover, the opening outer edge of the vessel 2, which is a portion to be in contact with the automotive glass 8 when the adherend 9 is covered with the vessel, is preferably provided with a cushion part 5. The vessel provided with the cushion part 5 can preferably be used for glass having a different curvature. The material of the cushion part 5 can be a silicone sponge or the like, in terms of heat resistance.

The superheated steam vessel is provided with one or more superheated steam outlets (superheated steam tubes 3 and nozzle holes 6 for discharging superheated steam). The superheated steam tubes 3 are each placed in the inside of the vessel 2, and have a nozzle hole 6 for discharging superheated steam. The shape of the nozzle holes 6 is not particularly limited; however, the nozzle holes 6 are preferably placed on the opening side of the vessel 2. The superheated steam tubes 3 serve to surround the inside of the superheated steam vessel 1 with the superheated steam supplied from a boiler placed in the outside of the superheated steam vessel 1 via a superheating unit, and to discharge the superheated steam from the nozzle holes 6. Therefore, the entrance of the superheated steam tubes 3 penetrates the vessel 2 and is connected to the boiler via the superheating unit.

The superheating unit superheats the steam generated in the boiler by a superheater provided in the superheating unit, and supplies the superheated steam to the superheated steam vessel 1. The temperature of the superheater during superheating of the steam is preferably 150 to 400° C., more preferably 200 to 400° C., and particularly preferably 250 to 350° C.

The superheated steam tubes 3 are capable of flowing dry gas in place of superheated steam, as required. Dry gas can thereby be sprayed from the superheated steam outlets.

The heaters 4 are placed in the inside of the vessel 2, and serve to maintain the internal temperature of the superheated steam vessel. In terms of maintaining the temperature of the superheated steam discharged from the nozzle holes 6, it is more preferable that the heaters 4 are placed in a position closer to the opening of the vessel 2 than the superheated steam tubes 3 are.

The superheated steam tubes 3 and the heaters 4 are supported in the inside of the vessel 2 by, for example, a support (not shown) integrated with the vessel 2.

The temperature of the heaters is preferably 125 to 195° C., more preferably 130 to 190° C., and particularly preferably 135 to 185° C.

The pressure of the steam supplied to the superheating unit is, for example, 0.1 to 0.3 MPa.

The time for spraying the superheated steam is preferably 30 to 180 seconds, and more preferably 45 to 100 seconds.

The time for spraying dry gas may be any time that can sufficiently remove the moisture from the inside of the vessel 2, and is preferably 10 seconds or more, more preferably 20 seconds or more, and particularly preferably 35 seconds or more. The upper limit of the time is not particularly limited; however, spraying for an overly long period of time is not efficient. Thus, the spraying time is preferably, for example, 60 seconds or less, and more preferably 50 seconds or less. The dry gas may be a gas from which the moisture is removed, and a gas having humidity similar to atmosphere can also be used. In order to prevent the moisture from adhering to the glass, it is preferable to maintain the temperature of the heaters 4 during spraying of dry gas. Dry gas is sprayed while opening the exhaust port 7 so as to discharge the steam remaining in the vessel 2 to the outside. Dry gas is thus sprayed to remove the (superheated) steam from the vessel 2 of the superheated steam vessel 1, and the temperature is then reduced, thereby preventing the appearance of the automotive glass 8 from being impaired by scale etc.

Advantageous Effects of Invention

The process of the present invention does not require large-scale facilities, allows curing of an adhesive in a short period of time, and enables a significant reduction of energy cost and an increase in working space efficiency in the step of bonding a member to an automotive glass. As a result, the step of bonding a member to an automotive glass can be incorporated as a part of the automotive production line, and the efficiency of the automotive production can be improved. Furthermore, according to the process of the present invention, stable quality can be maintained regardless of the difference in the curvature of the automotive glass, and the size, shape, etc., of the part to be attached.

Moreover, according to the process of the present invention, the curing of the adhesive is completed in a short period of time; therefore, the relative position of the member and the automotive glass can be maintained, even if the member is not temporarily fixed by a double-sided tape or the like. Thus, a temporary fixing step is unnecessary.

DESCRIPTION OF EMBODIMENTS

The present invention is described in detail below with reference to Production Examples, a Reference Example, and Examples; however, the present invention is not limited to these Examples.

Figure 1:
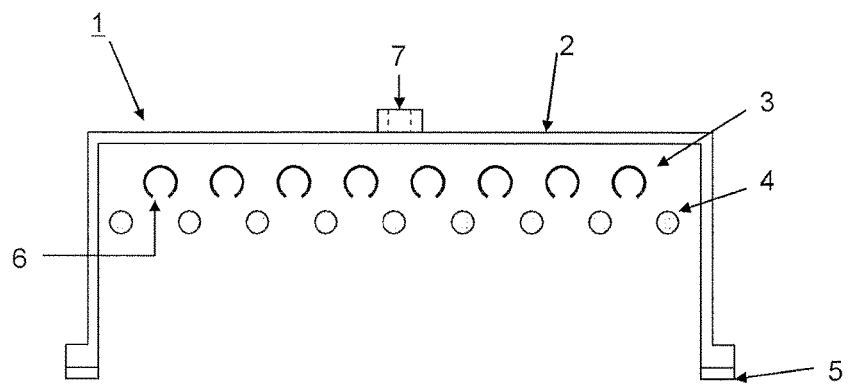
FIG. 1 a schematic diagram showing the structure of a superheated steam vessel of a superheated steam generator used in the Examples.
Figure 2:
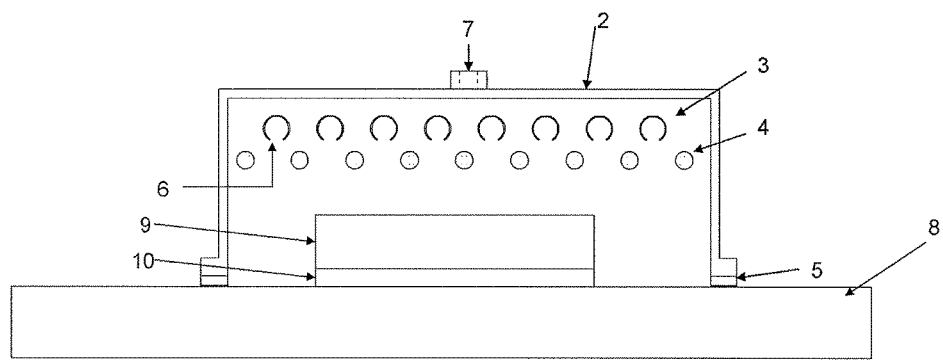
FIG. 2 shows the relationship between the superheated steam vessel, adherend, adhesive, and automotive glass in the curing step in the Examples.
Figure 3:
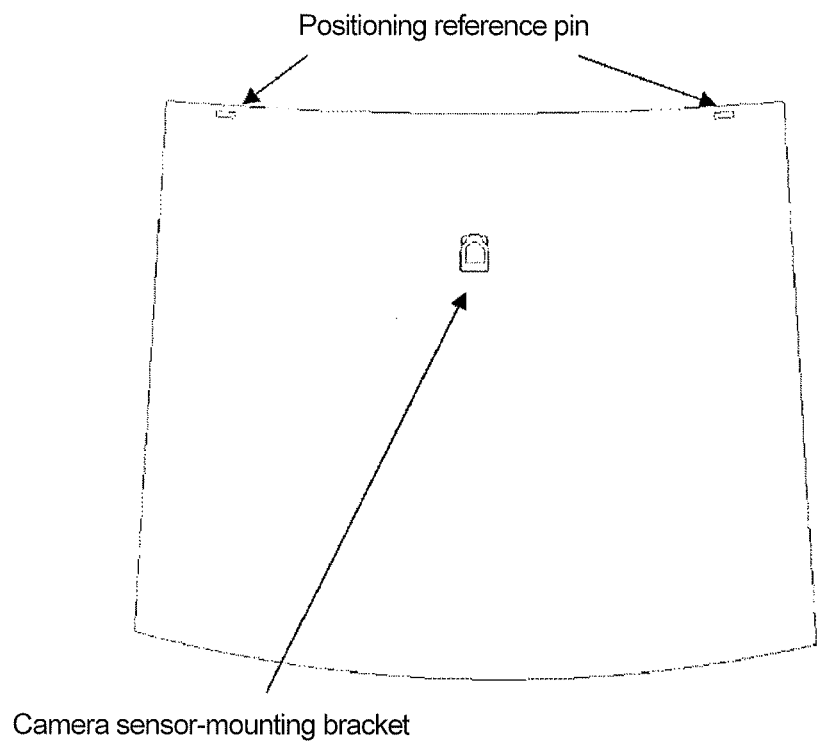
FIG. 3 is a pattern diagram showing an automotive windshield to which a camera sensor-mounting bracket is attached.

The superheated steam generator used in the present Examples was a superheated steam generator produced by Naomoto Corporation. The superheated steam generator comprises a boiler part for generating steam, a superheating unit for superheating the steam generated in the boiler part, and a superheated steam vessel for spraying the superheated steam supplied from the superheating unit to a target. The superheated steam vessel is equipped internally with superheated steam tubes accordingly having a nozzle hole on the lower surface, and heaters placed below the superheated steam tubes. The outer size of the superheated steam vessel is 380 mm long, 280 mm wide, and 136 mm high (excluding a cushion part). FIG. 1 shows the structure of the superheated steam vessel in the superheated steam generator produced by Naomoto Corporation.

PRODUCTION EXAMPLE 1

Molding of Camera Sensor-Mounting Bracket

Figure 4:
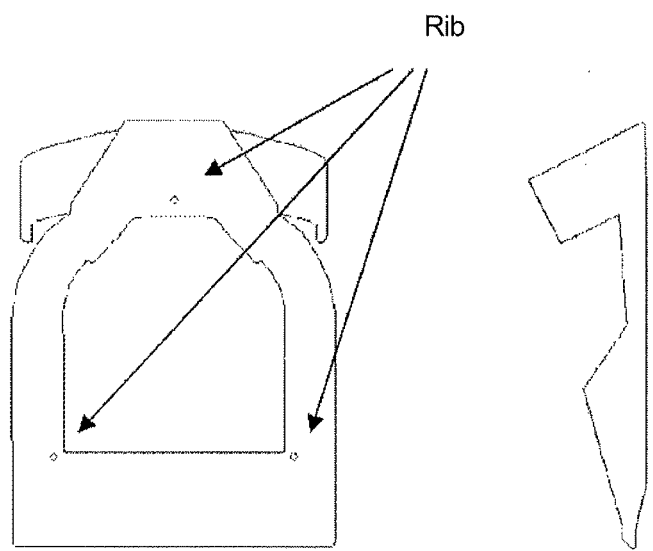
FIG. 4 shows the structure of a camera sensor-mounting bracket produced in Production Example 1.

A polyetherimide resin (containing 20% of glass fiber) was injection-molded by a known method to form the camera sensor-mounting bracket shown in FIG. 4. The size of the bracket in FIG. 4 was 76 mm long, 57 mm wide, and 2 mm thick. Ribs provided in three places had a height of 0.4 mm.

PRODUCTION EXAMPLE 2

Production of Adhesive Adherend

Figure 5:
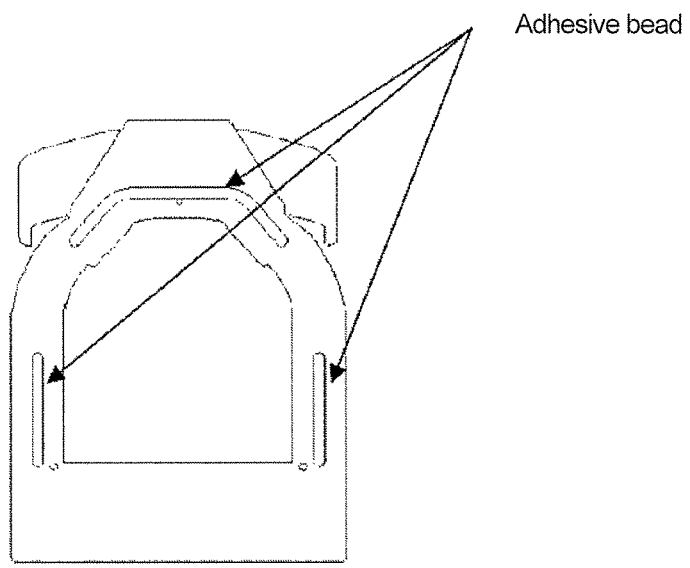
FIG. 5 shows the structure of a camera sensor-mounting bracket after discharge of an adhesive in Production Example 2.

The camera sensor-mounting bracket made of polyetherimide resin produced in Production Example 1 was bonded to a test piece (thickness: 3.5 mm/500×500 mm) of the same material as that of automotive tempered glass with black ceramic by discharging a two-component silicone/epoxy adhesive (MOS (registered trademark) 300, produced by Konishi Co., Ltd.) in three places (FIG. 5; total weight of the adhesive in the three places: about 0.45 g) of the adhesion surface of the bracket by a known two-component mixer, thereby forming an adhesive adherend.

As the primer, a silane compound-based primer was used for the adhesion surface of the camera sensor-mounting bracket made of polyetherimide resin.

EXAMPLE 1

The adhesive adherend produced in Production Example 2 was covered with the superheated steam vessel of the superheated steam generator produced by Naomoto Corporation, and superheated steam was discharged into the box for 50 seconds. In this case, the temperature of the superheater was set to 300° C., and the heater temperature in the vessel was set to 155° C. The discharge pressure of the steam in the boiler part was 0.2 MPa. After discharge of superheated steam, dry gas was sprayed into the vessel for 50 seconds. Thereafter, the cover of the superheated steam vessel was removed, and the temperature was reduced to equivalent to room temperature. Then, tensile strength was measured by an autograph at a speed of 10 mm/second.

EXAMPLES 2 to 5

The adhesive adherends were cured in the same manner as in Example 1, except that the heater temperature in the vessel was changed from 155° C. to 115° C., 135° C., 185° C., and 205° C., and their tensile strength was measured.

PRODUCTION EXAMPLE 3

Production of Adhesive Adherend

Figure 6:
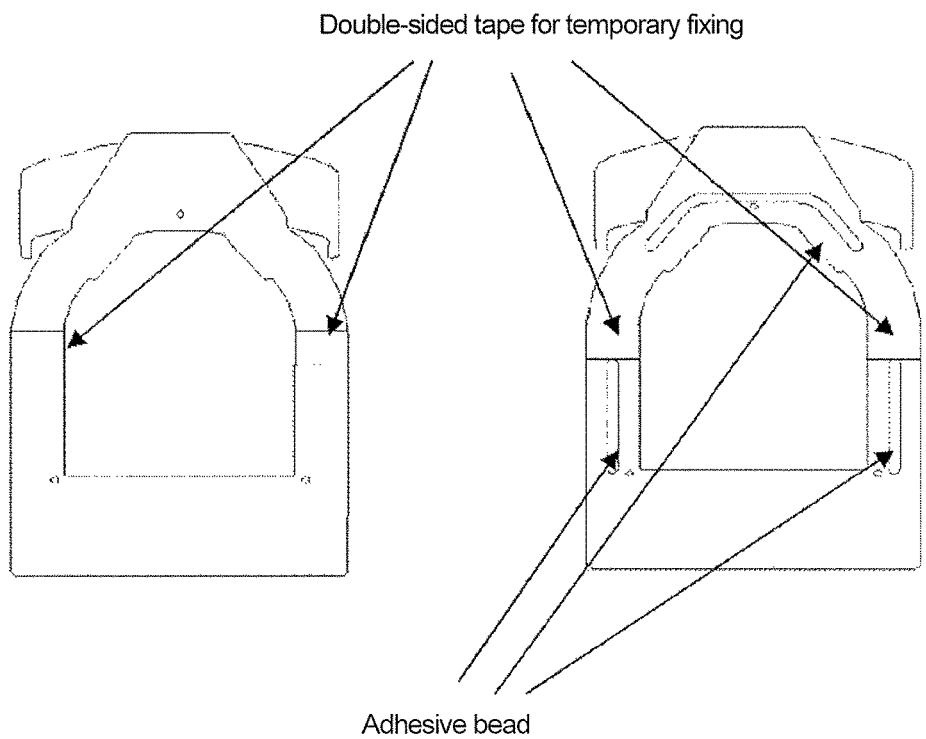
FIG. 6 shows the structure of a camera sensor-mounting bracket to which a double-sided tape for temporary fixing is attached (left figure) in Production Example 3, and the structure of the bracket to which an adhesive is discharged (right figure).

A double-sided tape for temporary fixing (thickness: 0.4 mm; 6 mm×8 mm) was attached to two places (FIG. 6, left) of the adhesion surface of the camera sensor-mounting bracket produced in Production Example 1.

The camera sensor-mounting bracket made of polyetherimide resin to which the double-sided tape for temporary fixing was attached was bonded to a test piece (thickness: 3.5 mm/500×500 mm) of the same material as that of automotive tempered glass with black ceramic by mixing a two-component silicone/epoxy adhesive (MOS (registered trademark) 300, produced by Konishi Co., Ltd.) by a known two-component mixer, and discharging the adhesive to three places (FIG. 6, right; total weight of the adhesive in the three places: about 0.45 g) of the adhesion surface of the bracket, thereby forming an adhesive adherend.

As the primer, a silane compound-based primer was used for the adhesion surface of the camera sensor-mounting bracket made of polyetherimide resin.

COMPARATIVE EXAMPLE 1

The adhesive adherend produced in Production Example 3 was aged in a constant-temperature, constant-humidity bath set under the conditions of 40° C./60% RH, and the time until tensile strength equivalent to that of Example 1 was obtained was determined.

COMPARATIVE EXAMPLE 2

The adhesive adherend produced in Production Example 3 was aged in a constant-temperature, constant-humidity bath set under the conditions of 23° C./60% RH, and the time until tensile strength equivalent to that of Example 1 was obtained was determined.

REFERENCE EXAMPLE 1 and EXAMPLES 6 to 8

The adhesive adherends were cured in the same manner as in Example 1, except that dry gas was sprayed for 0, 30, 40, and 60 seconds instead of 50 seconds, and their tensile strength was measured.

PRODUCTION EXAMPLE 4

Production of Adhesive Adherend
The camera sensor-mounting bracket made of polyetherimide resin produced in Production Example 1 was bonded to a test piece (thickness: 3.5 mm/500×500 mm) of the same material as that of automotive tempered glass with black ceramic by discharging a one-component curing urethane adhesive (Terolan 1510, produced by Henkel) to three places (FIG. 5; total weight of the adhesive in the three places: about 0.45 g) of the adhesion surface of the bracket using a known discharging device, thereby forming an adhesive adherend.

As the primers, a silane compound-based primer was used for the adhesion surface of the camera sensor-mounting bracket made of polyetherimide resin, and an isocyanate resin-based primer was used for the glass side.

EXAMPLE 9

The adhesive adherend produced in Production Example 4 was covered by the superheated steam vessel of the superheated steam generator produced by Naomoto Corporation, and superheated steam was discharged into the vessel for 60 seconds. In this case, the temperature of the superheater was set to 170° C., and the heater temperature in the vessel was set to 160° C. The discharge pressure of steam in the boiler part was 0.15 MPa. After discharge of superheated steam, dry gas was sprayed into the vessel for 60 seconds. After the temperature of the entire vessel was reduced to equivalent to room temperature, the cover of the superheated steam vessel was removed, and the cured adhesive adherend was taken out. When tensile strength was measured by an autograph at a speed of 10 mm/second, the strength was sufficient.

The following Tables 1 to 3 show the results obtained in Examples 1 to 9, Reference Example 1, and Comparative Examples 1 and 2.

TABLE 1

| | | Example 1 | Example 2 | Example 3 | Example 4 | Example 5 | Comparative Example 1 | Comparative Example 2 |
|---|---|---|---|---|---|---|---|---|
| Curing method | | Superheated steam | | | | | Constant-temperature, constant-humidity bath | |
| Temperature conditions | | 155° C. | 115° C. | 135° C. | 185° C. | 205° C. | 40° C./60% RH | 23° C./60% RH |
| Double-sided tape for temporary fixing | | Not used | | | | | Used | |
| Evaluation | Curing time | 100 sec (50 + 50) | | | | | 8 hr | 24 hr |
| | Strength | <100> | 60 | 99 | 101 | 89 | 100 | 100 |
| | Melting of bracket | None | None | None | None | Melted | None | None |

The curing time in Examples 1 to 5 is the sum of the discharge time of superheated steam and the discharge time of dry gas.
The strength is a value relatively compared with the measurement value of Example 1, which is regarded as 100.

TABLE 2

| | | Reference Example 1 | Example 6 | Example 7 | Example 1 | Example 8 |
|---|---|---|---|---|---|---|
| Curing method | | Superheated steam | Superheated steam | Superheated steam | Superheated steam | Superheated steam |
| Temperature conditions | | | | 155° C. | | |
| Discharge time | Superheated steam | | | 50 sec | | |
| | Dry air | 0 sec | 30 sec | 40 sec | 50 sec | 60 sec |
| Evaluation | Strength | 86 | 95 | 99 | 100 | 105 |
| | Surface adhering water | Adhering | Slightly adhering | None | None | None |

The strength is a value relatively compared with the measurement value of Example 1, which is regarded as 100.

TABLE 3

|  |  | Example 9 |
|---|---|---|
|  | Curing method | Superheated steam |
|  | Temperature conditions | 160° C. |
| Evaluation | Curing time | 120 sec (60 + 60) |
|  | Melting of bracket | None |

The curing time in Example 10 is the sum of the discharge time of superheated steam and the discharge time of dry gas.

REFERENCE SIGNS LIST

1. Superheated steam vessel
2. Vessel
3. Superheated steam tube
4. Heater
5. Cushion part
6. Nozzle hole
7. Exhaust port
8. Automotive glass
9. Adherend
10. Adhesive

The invention claimed is:

1. A process for producing an automotive glass with an adherend, the process comprising bonding together an adhesion surface of an adherend and an adhesion surface of an automotive glass using an adhesive, and then curing the adhesive using a superheated steam generator, thereby attaching the adherend to the automotive glass;
   wherein the superheated steam generator comprises:
   (1) a boiler part for generating steam,
   (2) a superheating unit for superheating the steam generated in the boiler part, and
   (3) a superheated steam vessel having an approximate box shape with one side opened, and equipped internally with one or more heaters and one or more superheated steam outlets for discharging the superheated steam supplied from the superheating unit; and
   wherein the step of curing the adhesive is performed by placing an opening outer edge of the superheated steam vessel on the automotive glass so that the adherend placed on the automotive glass is covered with the superheated steam vessel, spraying the superheated steam from the one or more superheated steam outlets to the adherend, and then spraying dry gas.

2. The production process according to claim 1, wherein the one or more heaters have a temperature of 125 to 195° C.

3. The production process according to claim 2, wherein the dry gas is sprayed for 10 seconds or more.

4. The production process according to claim 1, wherein the dry gas is sprayed for 10 seconds or more.

* * * * *